United States Patent
Mansi et al.

(10) Patent No.: US 10,909,416 B2
(45) Date of Patent: Feb. 2, 2021

(54) DEEP VARIATIONAL METHOD FOR DEFORMABLE IMAGE REGISTRATION

(71) Applicant: Siemens Healthcare GmbH, Erlangen (DE)

(72) Inventors: Tommaso Mansi, Plainsboro, NJ (US); Boris Mailhe, Plainsboro, NJ (US); Rui Liao, Princeton Junction, NJ (US); Shun Miao, Bethesda, MD (US)

(73) Assignee: Siemens Healthcare GmbH, Erlangen (DE)

( * ) Notice: Subject to any disclaimer, the term of this patent is extended or adjusted under 35 U.S.C. 154(b) by 22 days.

(21) Appl. No.: 16/440,215

(22) Filed: Jun. 13, 2019

(65) Prior Publication Data

US 2020/0034654 A1     Jan. 30, 2020

(30) Foreign Application Priority Data

Jul. 30, 2018    (EP) ..................... 18186293

(51) Int. Cl.
*G06K 9/00*     (2006.01)
*G06K 9/62*     (2006.01)
(Continued)

(52) U.S. Cl.
CPC ........... *G06K 9/6215* (2013.01); *G06F 17/18* (2013.01); *G06N 3/084* (2013.01); *G06N 5/046* (2013.01); *G06N 20/20* (2019.01)

(58) Field of Classification Search
CPC ...... G06K 9/6215; G06N 20/20; G06N 3/084; G06N 5/046; G06F 17/18
(Continued)

(56) References Cited

U.S. PATENT DOCUMENTS 8,600,131 B2 * 12/2013 Miller .................... A61B 6/501
                                               382/128
8,972,253 B2 * 3/2015 Deng ...................... G10L 15/14
                                               704/231
(Continued)

OTHER PUBLICATIONS

Dalca, Adrian V., et al. "Unsupervised learning for fast probabilistic diffeomorphic registration.", 2018, arXiv, pp. 1-10 (Year: 2018).*
(Continued)

*Primary Examiner* — Jonathan S Lee

(57) ABSTRACT

A correspondence between a source image and a reference image is determined. A generative model corresponds to a prior probability distribution of deformation fields, each deformation field corresponding to a respective coordinate transformation. A conditional model generates a style transfer probability distribution of reference images, given a source image and a deformation field. The first image data is the source image, and the second image data is the reference image. An initial first deformation field is determined. An update process is iteratively performed until convergence to update the first deformation field, to generate a converged deformation field representing the correspondence between the source image and the reference image. The update process includes: determining a change in one or more characteristics of the first deformation field to increase a posterior probability density associated with the first deformation field, given the source image and reference image; and changing the one or more characteristics in accordance with the determined change.

18 Claims, 8 Drawing Sheets

(51) Int. Cl.
  *G06N 20/20* (2019.01)
  *G06F 17/18* (2006.01)
  *G06N 3/08* (2006.01)
  *G06N 5/04* (2006.01)
(58) Field of Classification Search
  USPC .......................................................... 382/181
  See application file for complete search history.

(56) References Cited

U.S. PATENT DOCUMENTS

| | | | | |
|---|---|---|---|---|
| 9,031,844 | B2* | 5/2015 | Yu | G10L 15/14 |
| | | | | 704/256 |
| 9,569,843 | B1 | 2/2017 | Mailhe et al. | |
| 9,858,689 | B1 | 1/2018 | Mailhe | |
| 10,133,964 | B2 | 11/2018 | Guo | |
| 10,529,318 | B2* | 1/2020 | Kurata | G06N 3/08 |
| 10,540,798 | B1* | 1/2020 | Walters | G06T 11/001 |
| 10,595,727 | B2* | 3/2020 | Lu | G06N 3/08 |
| 10,624,558 | B2* | 4/2020 | Ceccaldi | G06T 7/11 |
| 10,650,492 | B2* | 5/2020 | He | G06T 11/00 |
| 10,733,788 | B2* | 8/2020 | Ceccaldi | G06N 3/006 |
| 10,753,997 | B2* | 8/2020 | Odry | G06N 3/0472 |
| 2017/0372193 | A1 | 12/2017 | Mailhe | |

OTHER PUBLICATIONS

Krebs, Julian, et al. "Unsupervised probabilistic deformation modeling for robust diffeomorphic registration.", 2018, arXiv, pp. 1-8 (Year: 2018).*

J. Krebs, T. Mansi, H. Delingette et al., "Robust non-rigid registration through agent-based action learning," in International Conferenceon Medical Image Computing and Computer-Assisted Intervention.Springer, 2017, pp. 344-352.

A. V. Dalca, G. Balakrishnan, J. Guttag, and M. Sabuncu, "Unsupervised learning for fast probabilistic diffeomorphic registration," in International Conference on Medical Image Computing and Computer-Assisted Intervention. Springer, 2018, pp. 729-738.

B. D. de Vos, F. F. Berendsen, M. A. Viergever, M. Staring, and I. Isgum, "End-to-end unsupervised deformable image registration with a convolutional neural network," in Deep Learning in Medical Image Analysis and Multimodal Learning for Clinical Decision Support. Springer, 2017, pp. 204-212.

Bora, Ashish, et al. "Compressed Sensing using Generative Models." arXiv preprint arXiv:1703.03208 (2017).

C. Tanner, F. Ozdemir, R. Profanter, V. Vishnevsky, E. Konukoglu, andO. Goksel, "Generative adversarial networks for MR-CT deformableimage registration," arXiv preprint arXiv:1807.07349, 2018.

Chang, S. Grace, Bin Yu, and Martin Vetterli. "Adaptive wavelet thresholding for image denoising and compression." IEEE Transactions on image processing 9.9 (2000): 1532-1546.

D. Mahapatra, B. Antony, S. Sedai, and R. Garnavi, "Deformablemedical image registration using generative adversarial networks," in Biomedical Imaging (ISBI 2018), 2018 IEEE 15th International Symposium on. IEEE, 2018, pp. 1449-1453.

G. Balakrishnan, A. Zhao, M. R. Sabuncu, J. Guttag, and A. V.Dalca, "An unsupervised learning model for deformable medical image registration," in Proceedings of the IEEE Conference on Computer Vision and Pattern Recognition, 2018, pp. 9252-9260.

H. Sokooti, B. de Vos et al., "Nonrigid image registration using multiscale 3D convolutional neural networks," in International Conference on Medical Image Computing and Computer-Assisted Intervention. Springer, 2017, pp. 232-239.

H. Uzunova, M. Wilms, H. Handels, and J. Ehrhardt, "Training cnns for image registration from few samples with model-based data augmentation," in International Conference on Medical Image Computing and Computer-Assisted Intervention. Springer, 2017, pp. 223-231.

J. Fan, X. Cao, P.-T. Yap, and D. Shen, "Birnet: Brain image registration using dual-supervised fully convolutional networks," arXiv preprint arXiv:1802.04692, 2018.

Jason, J. Yu, Adam W. Harley, and Konstantinos G. Derpanis. "Back to basics: Unsupervised learning of optical flow via brightness constancy and motion smoothness." In European Conference on Computer Vision, pp. 3-10. Springer, Cham, 2016.

Jain, Viren, et al. "Supervised learning of image restoration with convolutional networks." Computer Vision, 2007. ICCV 2007. IEEE 11th International Conference on. IEEE, 2007.

K. A. Eppenhof, M. W. Lafarge, P. Moeskops, M. Veta, and J. P. Pluim,"Deformable image registration using convolutional neural networks," in Medical Imaging 2018: Image Processing, vol. 10574. International Society for Optics and Photonics, 2018, p. 105740S.

Lexing Xie, et al. "Image Restoration" LectureColumbia University of New York; Mar. 23, 2009.

M. Jaderberg, K. Simonyan, A. Zisserman et al., "Spatial transformernetworks," in Advances in neural information processing systems, 2015, pp. 2017-2025.

M.-M. Rohe, M. Datar, T. Heimann, M. Sermesant, and X. Pennec, "SVF-net: Learning deformable image registration using shape matching," in International Conference on Medical Image Computing and Computer-Assisted Intervention. Springer, 2017, pp. 266-274.

Salakhutdinov, Ruslan. Learning deep generative models. Diss. University of Toronto, 2009.

Venkatakrishnan, Singanallur V., Charles A. Bouman, and Brendt Wohlberg. "Plug-and-play priors for model based reconstruction." Global Conference on Signal and Information Processing (GlobalSIP), 2013 IEEE. IEEE, 2013.

X. Liang, L. Lee, W. Dai et al., "Dual motion GAN for future-flow embedded video prediction," in Proceedings of the IEEE Conference on Computer Vision and Pattern Recognition, 2017, pp. 1744-1752.

X. Yang, R. Kwitt, M. Styner, and M. Niethammer, "Quicksilver: Fastpredictive image registration—a deep learning approach," NeuroImage, vol. 158, pp. 378-396, 2017.

Y. Hu, M. Modat, E. Gibson, W. Li, N. Ghavami, E. Bonmati, G. Wang,S. Bandula, C. M. Moore, M. Emberton et al., "Weakly-supervised convolutional neural networks for multimodal image registration," Medical Image Analysis, 2018.

Extended European Search Report (EESR) dated Apr. 12, 2019 in corresponding European Patent Application No. 18186293.9.

Bhushan Manav et al: "Motion Correction and Parameter Estimation in dceMRI Sequences: Application to Colorectal Cancer", Sep. 18, 2011 (Sep. 18, 2011), International Conference on Simulation, Modeling, and Programming for Autonomous Robots,SIMPAR 2010; [Lecture Notes in Computer Science; Lect.Notes Computer], Springer, Berlin, Heidelberg, pp. 476-483.

Krebs, Julian, et al. "Learning Structured Deformations using Diffeomorphic Registration." arXiv preprint arXiv:1804.07172 (Sep. 2018).

* cited by examiner

DEEP VARIATIONAL METHOD FOR DEFORMABLE IMAGE REGISTRATION

RELATED CASE

This application claims the benefit of EP 181816293, filed on Jul. 30, 2018, which is hereby incorporated by reference in its entirety.

TECHNICAL FIELD

The present disclosure relates to a method for determining a correspondence between a source image and a reference image.

BACKGROUND

Deformable image registration aims to find correspondence between pairs of images. In medicine, deformable image registration has a wide range of applications both in diagnosis and in therapy. For example, in the field of oncology, longitudinal images of the same patient are often acquired to monitor the progression of a tumour and to plan radiation therapy. In some examples, a radiation therapy plan is updated automatically depending on the progression of the tumour. Deformable registration of the longitudinal images corrects for differences in aspect, as well as deformations of the patient's body surrounding the tumour, for example caused by weight gain/loss, breathing, and/or other movements, allowing for efficient visualisation and comparison of the images, either manually or automatically.

Other applications of deformable image registration include motion correction, in which a series of images of a continuously/continually moving/deforming target are captured one after another (for example, as frames of a video), in which case deformable image registration corrects for the continuous/continual moving/deforming tissue to allow residual changes to the target to be identified. Further examples include deformable registration of images of corresponding anatomies of multiple patients, allowing for abnormalities in one or more of the anatomies to be identified or segment organs using an atlas image.

Deformable image registration involves determining a deformation field representing a correspondence between a source image and a reference image. Since the deformation field is typically high-dimensional and mathematically ill-defined, it needs to be heavily regularised. Existing methods include parametric approaches in which a model of the deformation field is controlled by a relatively small number of control points or parameters based on prior knowledge of possible deformations. Such methods are often unable to model complex deformations accurately, for example those exhibited by parts of the human anatomy.

Existing methods further include regularization of an energy computed on, for example, a Jacobian, Hessian, or Laplacian of the deformation field. Such methods can result in over-smoothed/over-regularised deformation fields and/or deformations fields that do not represent realistic deformations due to a lack of high-level prior knowledge of possible deformations.

Finally, deformable image registration typically involves the optimization of a high-dimensional functional. Iterative optimization procedure are most commonly used, leading to time-consuming algorithms that require minutes or more to compute.

SUMMARY

According to various aspects, there are provided methods and apparatus for determining a correspondence between a source image and a reference image, in accordance with the appended claims.

Further features and advantages will become apparent from the following description, given by way of example only, which is made with reference to the accompanying drawings.

DETAILED DESCRIPTION

In the present disclosure, an image is, for example, a set of digital data mapping a two- or three-dimensional domain to one or more real numbers, each of the real numbers associating an intensity with a voxel/pixel within the image domain. The term "image" may refer either to the data itself, or to a visual representation of the data when rendered using, for example, a screen or a projector.

Images may be captured using various imaging techniques including, for example, digital photography, magnetic resonance imaging (MRI), X-ray fluoroscopy, proton emission tomography (PET), echography, and computerised tomography (CT). Images captured using the same imaging technique may use different imaging parameters. For example, MRI may be parameterised as T1 weighted or T2 weighted. A given imaging technique using given imaging parameters is referred to as an imaging modality.

A deformation field is a mapping that transforms a co-ordinate system of an image. Deformation fields are expressed differently depending on the deformation model being used. In some examples, a deformation field is represented by a pixel-to-vector mapping or a voxel-to-vector mapping, associating a displacement vector with each pixel/voxel of the image.

Figure 1:
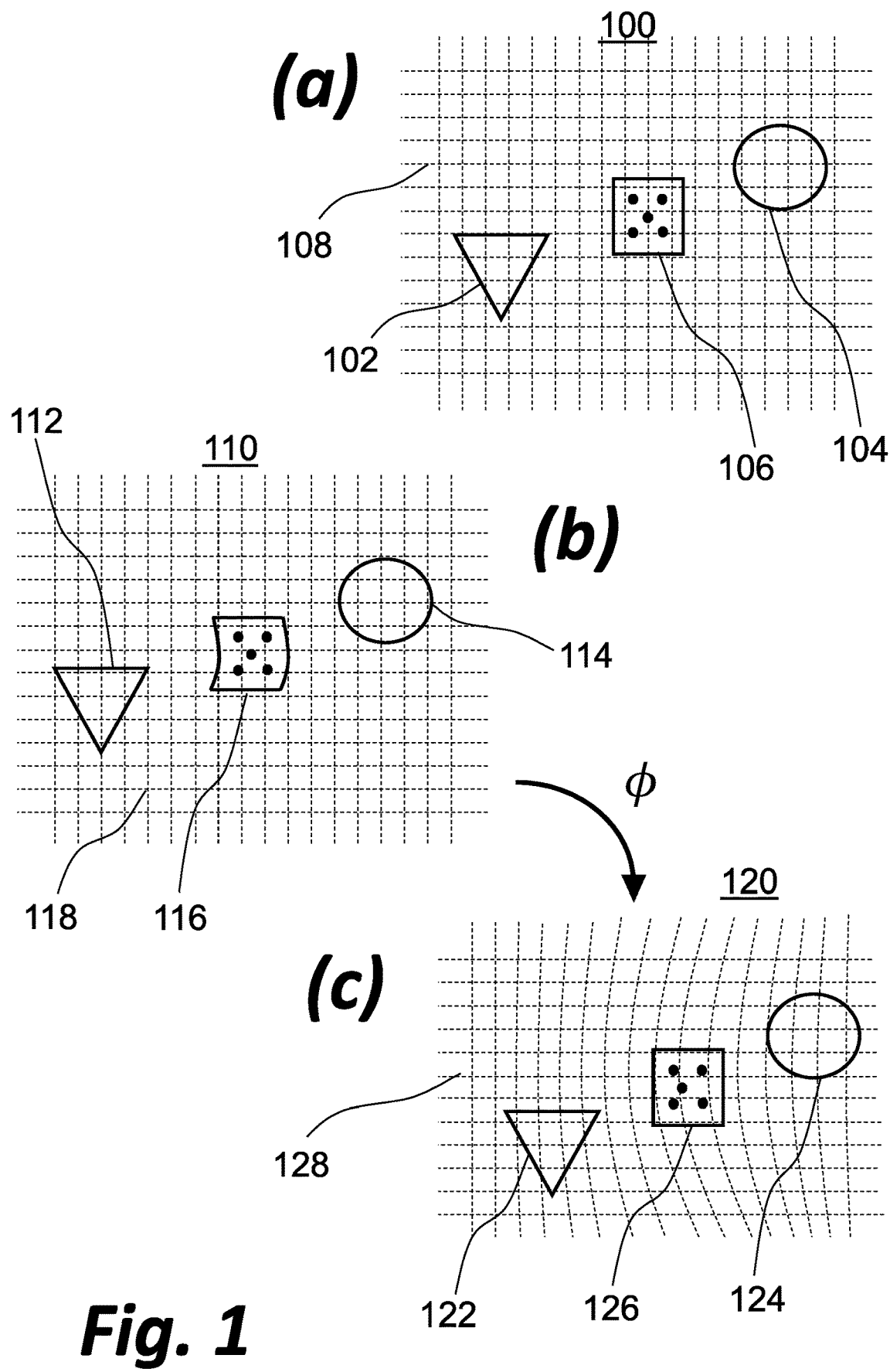
FIG. 1 shows a deformable registration of a source image to a reference image.

FIG. 1*a* shows a two-dimensional reference image 100 containing three objects: a triangle 102, a circle 104, and a die 106. The reference image 100 has an associated Cartesian co-ordinate system, represented by a Cartesian grid 108. The reference image 100 was captured at a first time.

FIG. 1*b* shows a two-dimensional source image 110, similarly containing three objects: a triangle 112, a circle 114, and a die 116. The source image 110 has an associated Cartesian co-ordinate system, represented by a Cartesian grid 118. In this example, the source image 110 was captured at a second time, using the same imaging modality as that of the reference image 100. It is observed that, while the triangle 112 and the circle 114 appear to correspond to the triangle 102 and the circle 104, the die 116 appears warped compared with the die 106.

The present embodiment provides a method of determining a correspondence between the source image 110 and the reference image 100. The correspondence is represented by a deformation field ϕ, which encodes a coordinate transformation that may be applied to the Cartesian grid 118 of the source image 110. FIG. 1c shows a transformed source image 120, which is the result of applying the deformation field ϕ to the source image 110. The transformed source image 120 contains a triangle 122, a circle 124, and a die 126. The transformed source image 120 has a transformed co-ordinate system, represented by a transformed grid 128. In this example, the deformation field ϕ is non-uniform, and accordingly different regions of the source image 100 are deformed differently to arrive at the transformed source image 120. As observed in the present example, features within the source image move as a result of the source image being transformed. For this reason, source images are sometimes referred to as moving images, whereas reference images are sometimes referred to as fixed images.

It is observed that the transformed source image 120 approximately corresponds to the reference image 100. In particular, the die 126 of the transformed source image 120 appears to correspond approximately to the die 106 of the reference image 100. However, closely comparing the reference image 100 with the transformed source image 120 reveals that a central spot on the die 126 appears in a different position to a corresponding central spot on the die 106. This difference is residual to the co-ordinate transformation encoded by the deformation field ϕ, suggesting that in the interval between the first time and the second time, the central spot has moved relative to its surrounding region. Comparing the reference image 100 with the transformed source image could be performed manually, for example by overlaying the transformed source image on top of the reference image, or alternatively could be performed automatically by a computer.

In medical applications, differences that are residual to a co-ordinate transformation between a source image and a reference image are often of interest. In the field of oncology, for example, the growth or change of a tumour is residual to deformations in the surrounding tissue of a patient's body.

As mentioned above, the reference image 100 and the source image 110 have the same modality. Determining a correspondence between the source image 110 and the reference image 100 is therefore referred to as monomodal registration. In other examples, a source image and a reference image are captured using different modalities, and determining a correspondence between the source image and the reference image is referred to as multimodal registration. The present embodiments are applicable both to monomodal registration and to multimodal registration, as will be described in detail hereafter.

Figure 2:
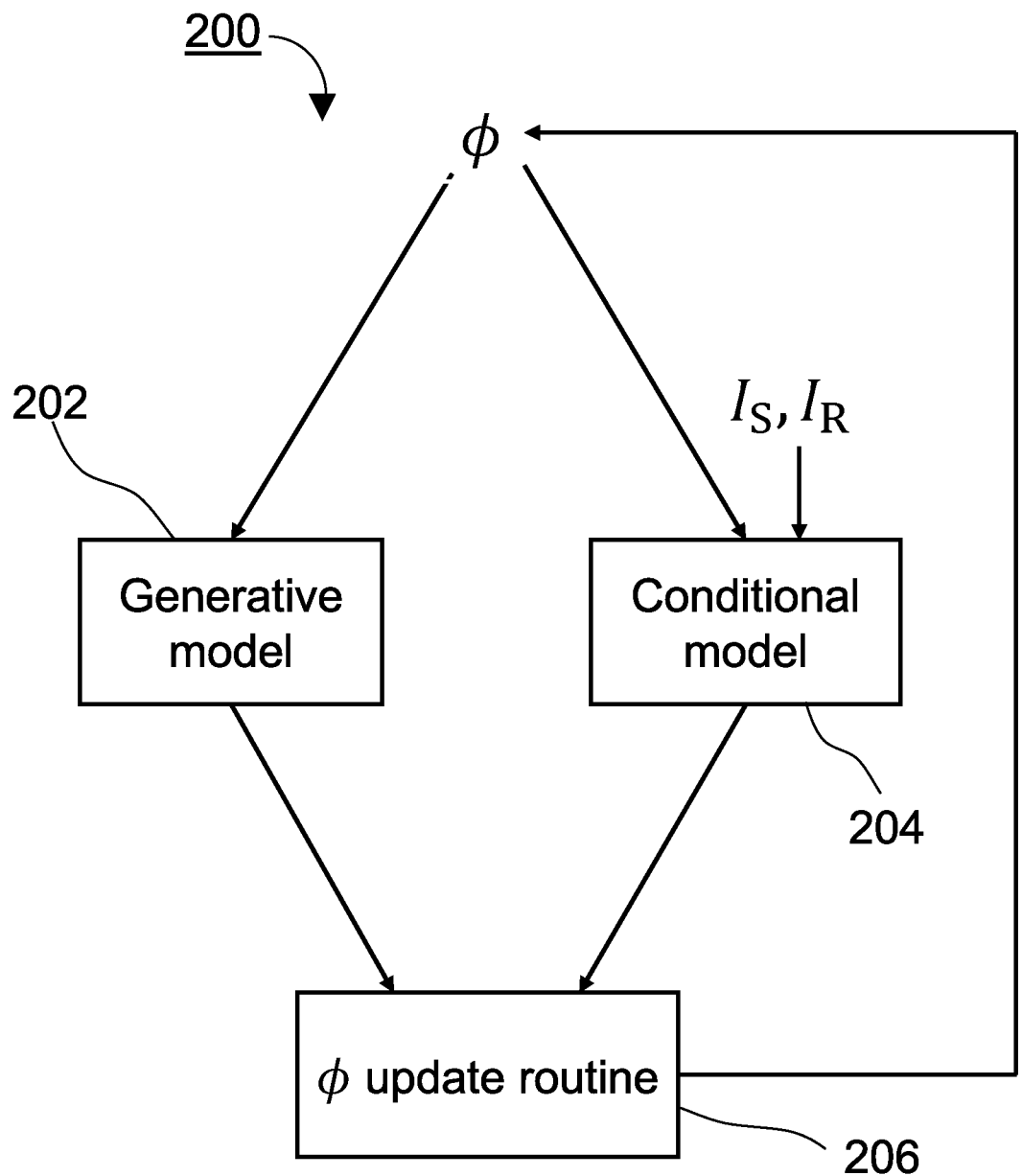
FIG. 2 is a schematic diagram of a method for determining a deformation field.

As shown in FIG. 2, an exemplary correspondence determining method 200 for determining a correspondence between a source image $I_S$ and a reference image $I_R$ employs a generative model 202, a conditional model 204, and an update routine 206. The generative model 202 corresponds to a prior probability distribution of deformation fields, each deformation field corresponding to a respective co-ordinate transformation. The prior probability distribution represents the expected distribution of deformation fields, given the particular application to which the deformable registration method is being applied. For example, in a medical application a particular organ may be expected to deform in a particular way when a patient breathes. Deformation fields consistent with this expected deformation would have a higher probability in the prior probability distribution than other arbitrary deformation fields.

For a given source image and a given deformation field, the conditional model 204 generates a style transfer probability distribution of reference images. A style transfer probability density $P(I_R|I_S,\phi)$ associated with the reference image $I_R$, given the source image $I_S$ and the deformation field ϕ, can be estimated using the conditional model 204, as will be described hereafter with reference to two exemplary conditional models.

Given the prior probability density $p(\phi)$ and the style transfer probability density $p(I_R|I_S,\phi)$, a posterior probability density $p(\phi|I_R,I_S)$ can be determined in principle using Bayes' theorem in the form of Equation (1):

$$p(\phi|I_R, I_S) = \frac{p(\phi)p(I_R | I_S, \phi)p(I_S)}{p(I_R, I_S)}. \quad (1)$$

The present method involves determining a deformation field that maximises the posterior probability density $p(\phi|I_R, I_S)$. The determined deformation field represents a best estimate of the correspondence between the source image $I_S$ and the reference image $I_R$. It is noted that the probability densities $p(I_S)$ and $p(I_R,I_S)$ are independent of the deformation field ϕ, and hence the dependence of the posterior probability density $p(\phi|I_R,I_S)$ on ϕ is entirely due to the dependence of the prior probability distribution $p(\phi)$ and the style transfer probability distribution $p(I_R|I_S,\phi)$ on ϕ. Taking a logarithm of Equation (1) leads to Equation (2):

$$\log p(\phi|I_R,I_S)=k+\log p(\phi)+\log p(I_R|I_S,\phi), \quad (2)$$

where k is independent of the deformation field ϕ. Since the logarithm is a strictly increasing function, it follows that maximising the sum of the log probability densities on the right hand side of Equation (2) is equivalent to maximising the posterior probability density of Equation (1).

The update routine 206 updates the deformation field ϕ to increase the sum of log probability densities given by Equation (2), thereby also increasing the posterior probability density given by Equation (1). In this example, updating the first deformation field includes determining, from the generative model 202 and the conditional model 204, a gradient with respect to ϕ of the log posterior probability density given by Equation (2).

The above process is repeated iteratively until predetermined convergence criteria are satisfied, resulting in a converged deformation field that represents the correspondence between the source image $I_S$ and the reference image $I_R$.

Figure 3:
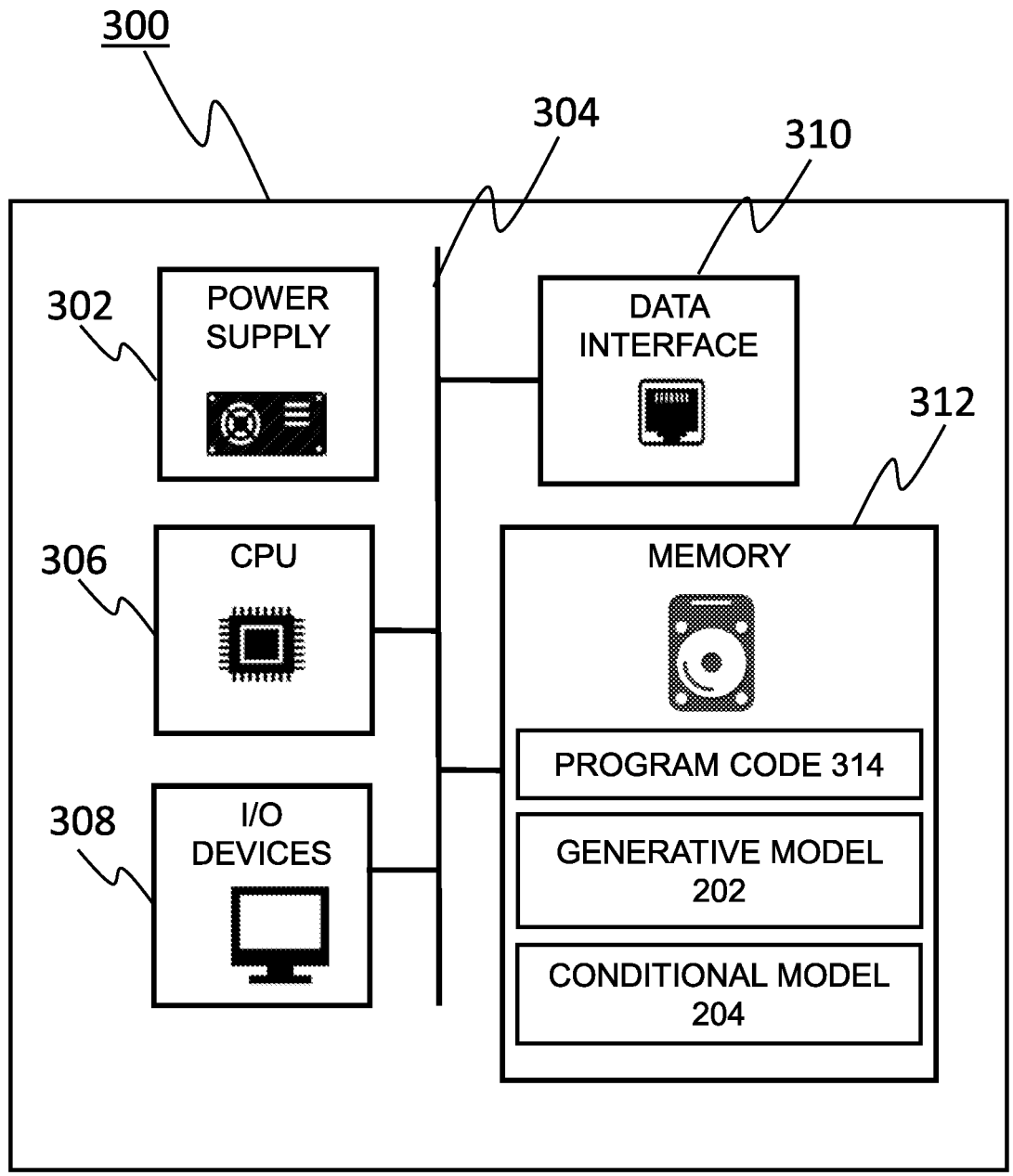
FIG. 3 is a flow diagram of a routine for determining a deformation field.

FIG. 3 shows a computing device 300 (e.g., computer or image processor) configured to implement methods in accordance with the present embodiment. The computing device 300 includes a power supply 304 and a system bus 304. The system bus 304 is connected to: a CPU 306; input/output (I/O) devices 308; a data interface 310; and a memory 312. The memory 312 is a non-transitory memory device and holds program code 314, the generative model 202, and the conditional model 204. In this example, I/O devices 308 include a monitor, a keyboard, and a mouse. The data interface 310 is connected one or more sources of image data.

In an example, the computing device 300 is deployed in a hospital or other medical institution and is used by medical professionals to perform deformable registration of medical images. For example, computing device 300 may be used to register longitudinal images of cancer patients in order to adjust radiotherapy plans. Alternatively or additionally, computing device 300 may be used for motion correction of a series of images captured using a medical device. Program code 314 may be provided to the medical institution as software. In some examples, program code for performing deformable registration may be integrated within hardware and/or software of a medical device that captures image data. In other examples, deformable registration of medical images may be performed by a remote system or a distributed computing system.

Figure 4:
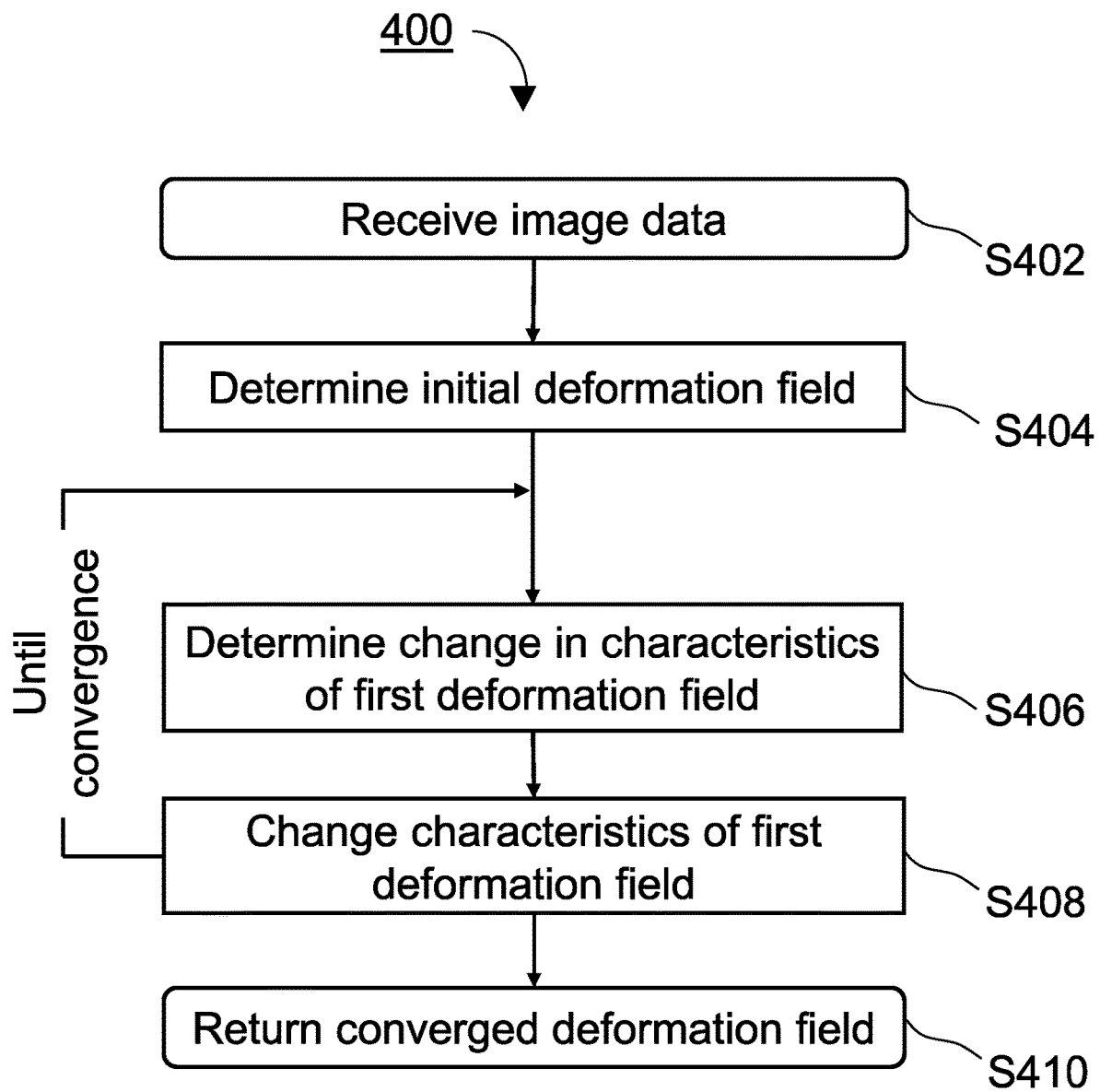
FIG. 4 is a schematic diagram of a variational autoencoder (VAE).

FIG. 4 shows a routine 400 stored within program code 314 which, when executed by the CPU 306, causes the computing device 300 to implement the correspondence determining method 200. The generative model 202 and the conditional model 204 are pre-trained prior to the routine 400 being executed, as will be described hereafter. The computing device 300 receives, at S402, first image data comprising the source image $I_S$ and second image data comprising the reference image $I_R$ via the data interface 310. In some examples, the first image data and the second image data are received from the same source, for example from a medical device such as a CT scanner, a PET scanner, or an MRI scanner, or from an image database. In other examples, the first image data and the second image data are received from different sources, for example different medical devices and/or image databases.

The computing device 300 determines, at S404, an initial deformation field $\phi_0$, where $\phi_t$ denotes the deformation field after t iterations of an update routine, as will be described hereafter. In this example, the initial deformation field $\phi_0$ is determined by randomly sampling from the generative model 202 as will be described hereafter. In other examples, an initial guess of the deformation field may be provided as $\phi_0$, for example using an existing parametric or a non-parametric deformable registration method.

The computing device 300 determines, at S406, a change in one or more characteristics of the first deformation field $\phi_0$. In this example, determining the change comprises determining gradients of the log probability densities log $p(\phi)$ and log $p(I_R|I_S,\phi)$ respectively. A gradient of log $p(\phi|I_R, I_S)$ is determined as the sum of the determined gradients of log $p(\phi)$ and log $p(I_R/I_S,\phi)$, in accordance with Equation (2). The change in characteristics is determined according to a gradient-based update rule, as shown by the Equation (3):

$$\phi_{t+1} = \phi_t + \gamma_t P^{-1} g_t, \quad (3)$$

in which: $g_t = \nabla_\phi \log p(\phi|I_R, I_S)|_{\phi=\phi_t}$; $\gamma_t$ is a step size, which may be fixed or may vary with step number t; and P is a preconditioning matrix that affects the direction and the size of the change in $\phi$ induced by (3). Different gradient methods vary from each other by using different step sizes and preconditioning matrices. For ordinary gradient ascent, P is an identity matrix. Other examples of gradient methods include the Broyden-Fletcher-GoldfarbShanno (BFGS) algorithm and Adam.

The computing device 300 changes, at S408, characteristics of the first deformation field in accordance with the determined change. The process of determining a change and changing the characteristics in accordance with the determined change is repeated iteratively, resulting in a sequence of deformation fields $\{\phi_t\}_{t=0}^T$, where $\phi_T$ is a converged deformation field that sufficiently approximates an optimal deformation field $\phi^*$ according to predefined convergence criteria. The optimal deformation field $\phi^*$ is defined as a deformation field that maximises the posterior probability density of Equation (1).

The computing device 300 returns, at S410, the converged deformation field $\phi_T$, which corresponds to a co-ordinate transformation representing the correspondence between the source image $I_S$ and the reference image $I_R$.

In some examples of the present embodiments, the converged deformation field $\phi_T$ is applied to the source image $I_S$ to determine a transformed source image $I_S \cdot \phi_T$. For monomodal registration, the transformed source image may then be compared with the reference image $I_R$, either manually or by a computer program. For multimodal registration, a style transfer operator for translating between two imaging modalities may be applied to the transformed source image or the reference image before comparison.

Figure 5:
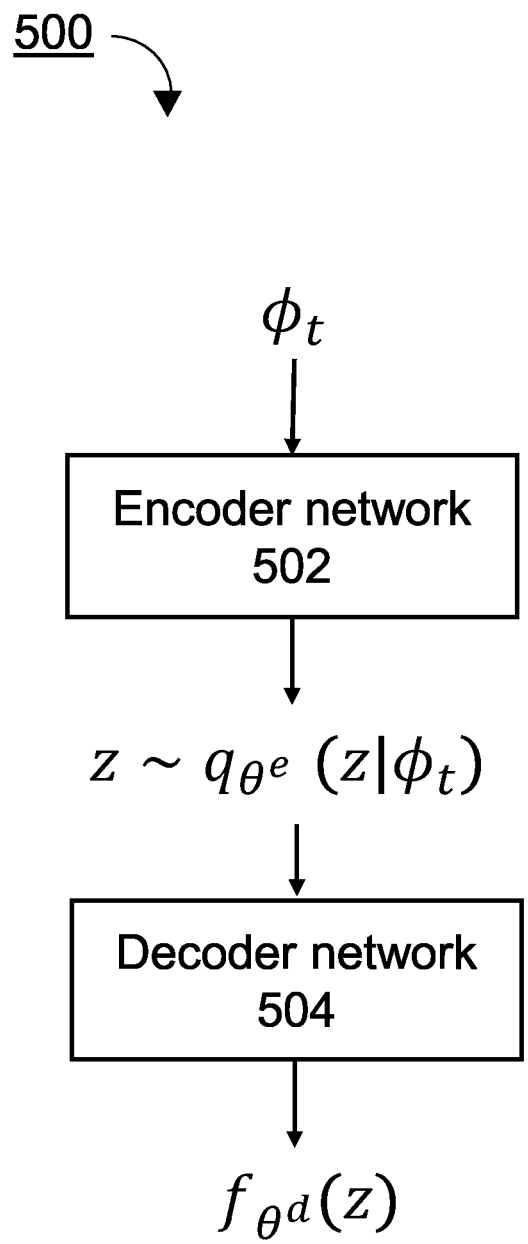
FIG. 5 is a schematic diagram of a routine for determining a deformation field and refining a generative model.

FIG. 5 shows an example of a variational autoencoder (VAE) 500 for implementing a generative model in accordance with the present embodiment. The VAE 500 includes an encoder network 502 and a decoder network 504. The encoder network 502 is a convolutional deep neural network having convolutional layers and fully-connected layers. A parameter vector $\theta^e$ comprises connection weights between neurons in the encoder network 502. The encoder network 502 is configured to receive a deformation field $\phi$ as an input, and to output a distribution $q_{\theta^e}(z|\phi)$ of latent variables z. In this example, $q_{\theta^e}(z|\phi)$ is a multivariate normal distribution with mean $\mu_{\theta^e}(\phi)$ and covariance $\Sigma_{\theta^e}(\phi)$ such that $q_{\theta^e}(z|\phi) = \mathcal{N}(\mu_{\theta^e}(\phi), \Sigma_{\theta^e}(\phi))$, where the mean $\mu_{\theta^e}(\phi)$ and the covariance $\Sigma_{\theta^e}(\phi)$ are determined by the encoder network 504.

The decoder network 504 is a deconvolutional deep neural network having fully-connected layers and deconvolutional layers. A parameter vector $\theta^d$ comprises connection weights between neurons in the decoder network 504. The decoder network 504 is configured to take a latent variable z as an input, and to output a deterministic function $f_{\theta^d}(z)$ of the latent variable. For a given latent variable z, a given deformation field is associated with a tractable probability density $p_{\theta^d}(\phi|z)$. The prior probability density $p(\phi)$ is given by an integral $\int p_{\theta^d}(\phi|z) p(z) dz$, where $p(z)$ is a probability density of the latent variables. The integral for determining $p(\phi)$ for a given deformation field $\phi$ is generally intractable, but can be estimated with the help of the encoder network 502, as will be described in more detail hereafter.

In the present example, $p_{\theta^d}(\phi|z)$ is assumed to follow an isotropic multivariate normal distribution such that $p_{\theta^d}(\phi|z) = \mathcal{N}(f_{\theta^d}(z), \sigma^2 I)$, where I is an identity matrix and $\sigma^2$ is a hyperparameter. Therefore, the log probability density log $p_{\theta^d}(\phi|z)$ depends on the squared Euclidian distance between the deformation field $\phi$ and the deterministic function $f_{\theta^d}(z)$, for example according to a relation log $p_{\theta^d}(\phi|z) = K - \|\phi - f_{\theta^d}(z)\|^2/(2\sigma^2)$ for a constant K.

Sampling z from a multivariate normal distribution $p(z) = \mathcal{N}(0, I)$, where I is an identity matrix, and passing the sampled z value through the decoder network 504 is equivalent to sampling from the prior probability distribution of deformation fields. In the example discussed above in which the generative model 202 is implemented using the VAE 500, the computing device 300 determines the initial deformation field $\phi_0$ by sampling from the prior distribution in this way.

As discussed above, determining a change in one or more characteristics of the deformation field $\phi t$ includes determining a gradient of the log prior probability density log $p(\phi)$ using the generative model 202. In the case that the generative model 202 is implemented using the VAE 500, a variational lower bound of the log prior probability density log p(ϕ) for a given deformation field ϕ is given by Equation (4):

$$\log p(\phi) \text{KL}[q_{\theta^e}(z|\phi), p(z|\phi)] = \mathbb{E}_{z \sim q_{\theta^e}}[\log p_{\theta^d}(\phi|z)] - \text{KL}[q_{\theta^e}(z|\phi), p(z)], \quad (4)$$

where KL denotes the Kullback-Leibler divergence between two distributions. Since the KL divergence is strictly non-negative, the left hand side of Equation (4) is a lower bound to log p(ϕ). Furthermore, for a sufficiently well-trained encoder network 502, the KL divergence term on the left hand side will be close to zero, and hence Equation (4) gives an approximation of the log prior probability density log p(ϕ). The first term on right hand side of Equation (4) is tractable by sampling, while the KL term on the right hand side is given in closed form for the multivariate normal distributions $p(z) = \mathcal{N}(0,I)$ and $q_{\theta^e}(z|\phi) = \mathcal{N}(\mu_{\theta^e}(\phi), \Sigma_{\theta^e}(\phi))$.

In the present example, in order to determine the gradient of log p(ϕ) with respect to the deformation field ϕ, the deformation field $\phi_t$ is forward propagated through the encoder network 502, causing the encoder network 502 to output a distribution $q_{\theta^e}(z|\phi_t)$ of latent variables associated with the deformation field $\phi_t$. One or more latent variables are sampled from the distribution $q_{\theta^e}(z|\phi_t)$ and forward propagated through the decoder network 504, which outputs deterministic functions $f_{\theta^d}(z)$ of the one or more sampled latent variables, from which one or more unbiased estimates of the variational lower bound of Equation (4) are determined. An estimated gradient of the variational lower bound with respect to ϕ, and hence an estimated gradient of the log prior probability density with respect to ϕ, is determined from the determined unbiased estimates of the variational lower bounds. The gradient of the second term on the right hand side of Equation (4) in the present example is determined by backpropagating the estimated variational lower bound or bounds. In a further example, the mean value $z_\mu$ of the distribution $q_{\theta^e}(z|\phi_t)$ is forward propagated through the decoder network 504 to determine a deterministic function $f_{\theta^d}(z_\mu)$, from which an estimate of the variational lower bound is determined, and this estimate is used for determining an estimated gradient of the log prior probability density with respect to ϕ.

For the present embodiment, generative models may be implemented using other methods instead of VAEs. Examples of other generative models include generative adversarial networks (GANs), Gaussian process models and denoising auto-encoders.

As discussed above, determining a change in one or more characteristics of the deformation field $\phi_t$ further includes determining a gradient of the log style transfer probability density log $p(I_R/I_S, \phi)$ using the conditional model 204. In an example of monomodal registration, the style transfer probability density is modelled as random noise accounting for image noise and residual changes between the reference image and the transformed source image (for example, residual changes in topology).

In one example, the random noise is assumed to be Gaussian random noise, and hence the conditional model generates a multivariate normal distribution such that $p(I_R|I_S, \phi) = \mathcal{N}(I_S \cdot \phi, \sigma_r^2 I)$, where the variance $\sigma_r^2$ is determined from the image data and I is an identity matrix. In this case, $\log p(I_R|I_S, \phi) = K_r - \|I_S \cdot \phi - I_R\|^2/(2\sigma_r^2)$ for a constant $K_r$. The gradient of the log style transfer probability density with respect to the deformation field ϕ is determined using this equation. The means by which the variance σ is determined from the image data depends on the modality of the source image and the reference image. In some examples, the variance $\sigma_r^2$ is matched to the signal to noise ratio (SNR) of the device or devices capturing the images. This may be included, for example, in metadata contained within the image data comprising the source image and/or the reference image. In other examples, the variance $\sigma_r^2$ is not known a priori and is instead learned from image data as part of a joint optimisation routine.

The Gaussian noise model described above may be suitable, for example, for monomodal registration of MRI images, which are known to exhibit Gaussian noise. In other examples of monomodal registration, the random noise is assumed to take other forms, for example Poisson noise in the case of a CT scan.

In some examples of multimodal registration, a style transfer operator may be determined for translating the modality of the source image to the modality of the reference image. By imaging identical objects using two modalities, known methods can be used to determine a style transfer operator for translating an image between modalities associated with the different imaging techniques/parameters. In some examples, a known style transfer operator is applied to the source image or the reference image, and the registration process proceeds as monomodal registration.

Figure 6:
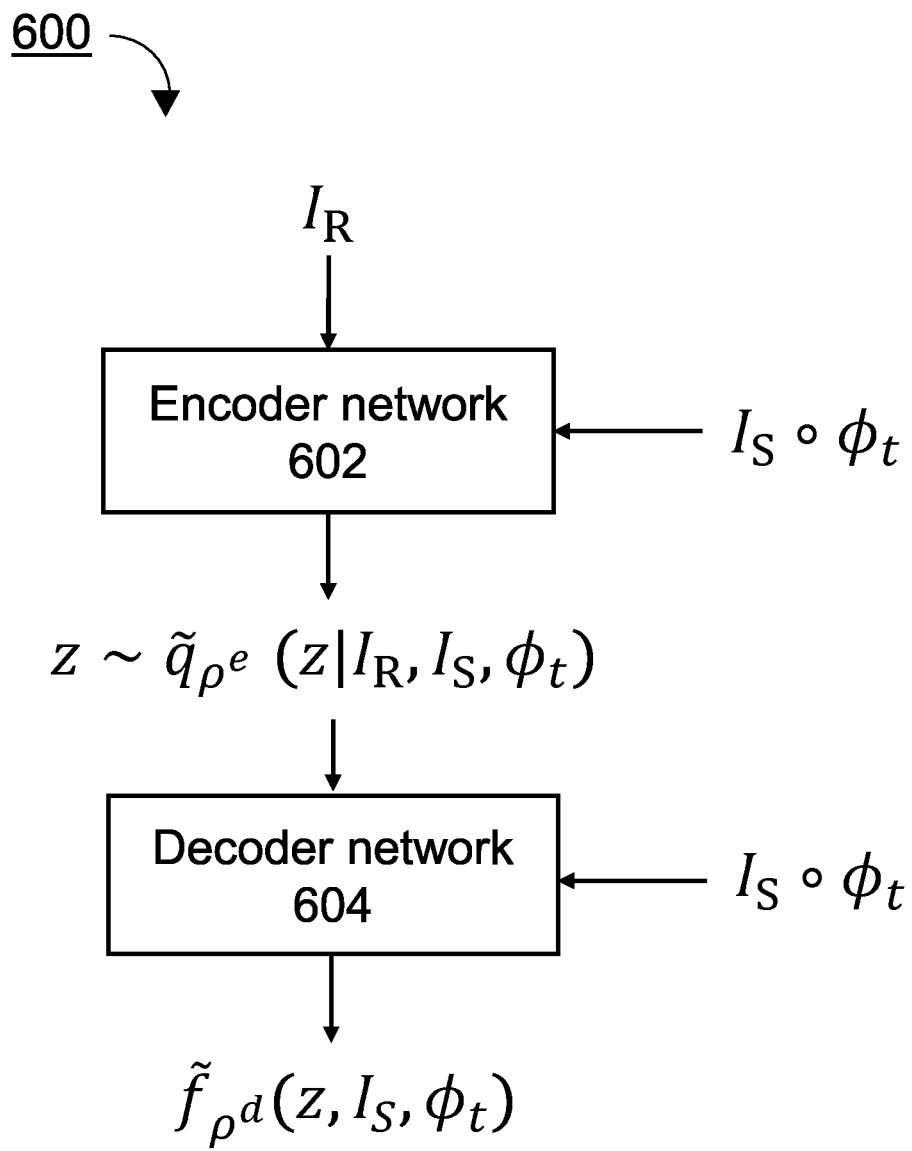
FIG. 6 is a schematic diagram of a conditional variational autoencoder (CVAE).

In some examples of multimodal registration, the style transfer probability density is modelled using a conditional generative model. Examples of suitable conditional generative models are those generated by conditional variational autoencoders (CVAEs) and conditional generative adversarial networks (CGANs). FIG. 6 shows an example of a conditional variational autoencoder (CVAE) 600 for generating a conditional model in accordance with the present embodiment. The CVAE 600 includes an encoder network 602 and a decoder network 604. The encoder network 602 is a convolutional deep neural network having a series of convolutional layers connected to a series of fully-connected layers. A parameter vector $\rho^e$ comprises connection weights between neurons in the encoder network 602. The encoder network 602 is configured to receive a reference image $I_R$ and a transformed source image $I_S \cdot \phi$ as inputs, and to output a distribution $\tilde{q}_{\rho^e}(z|I_R, I_S \cdot \phi)$ of latent variables z. In this example, $\tilde{q}_{\rho^e}(z|I_R, I_S \cdot \phi)$ is a multivariate normal distribution with mean $\tilde{\mu}_{\rho^e}(I_R, I_S \cdot \phi)$ and covariance $\tilde{\Sigma}_{\rho^e}(I_R, I_S \cdot \phi)$ such that $\tilde{q}_{\rho^e}(z|I_R, I_S \cdot \phi) = \mathcal{N}(\tilde{\mu}_{\rho^e}(I_R, I_S \cdot \phi), \tilde{\Sigma}_{\rho^e}(I_R, I_S \cdot \phi))$, where the mean $\tilde{\mu}_{\rho^e}(I_R, I_S \cdot \phi)$ and the covariance $\tilde{\Sigma}_{\rho^e}(I_R, I_S \cdot \phi)$ are determined by the encoder network 604.

The decoder network 604 is a deconvolutional deep neural network having fully-connected layers and deconvolutional layers. A parameter vector $\rho^d$ comprises connection weights between neurons in the decoder network 504. The decoder network 604 is configured to take a latent variable z, the transformed source image $I_S \cdot \phi$, and the deformation field ϕ as an input and to output a deterministic function $\tilde{f}_{\rho^d}(z, I_S \cdot \phi)$ of the latent variable and the transformed source image. For a given latent variable z, a given reference image is associated with a tractable probability density $p_{\theta^d}(I_R|z, I_S \cdot \phi)$. In the present example, $p_{\theta^d}(I_R|z, I_S \cdot \phi)$ is assumed to follow an isotropic multivariate normal distribution such that $p_{\theta^d}(I_R|z, I_S \cdot \phi) = \mathcal{N}(\tilde{f}_{\rho^d}(z, I_S \cdot \phi), \tilde{\sigma}^2 I)$, where I is an identity matrix and $\tilde{\sigma}^2$ is a hyperparameter. Therefore, the log probability density log $p_{\theta^d}(I_R|z, I_S \cdot \phi)$ depends on the squared Euclidian distance between the reference image $I_R$ and the deterministic function $\tilde{f}_{\rho^d}(z, I_S \cdot \phi)$, for example according to a relation $\log p_{\theta^d}(\phi|z) = \tilde{K} - \|I_R - \tilde{f}_{\rho^d}(z, I_S \cdot \phi)\|^2/(2\tilde{\sigma}^2)$ for a constant $\tilde{K}$.

Sampling z from a multivariate normal distribution $p(z) = \mathcal{N}(0,I)$, where I is an identity matrix, and passing the sampled z value through the decoder network 604 along with the source image $I_S$ and the deformation field $\phi$ is equivalent to sampling from the style transfer probability distribution of reference images, given the source image $I_S$ and the deformation field $\phi$.

As discussed above, determining a change in one or more characteristics of the deformation field $\phi_t$ includes determining a gradient of the log style transfer probability density log $p(I_R|I_S,\phi)$ using the conditional model 204. For a given deformation field $\phi$, a variational lower bound of the style transfer prior probability density log $p(I_R|I_S,\phi)$ is given by Equation (5):

$$\log p(I_R|I_S,\phi) - KL[\tilde{q}_{\rho^e}(z|I_R,I_S\cdot\phi), p(z|I_R,I_S\cdot\phi)] = \mathbb{E}_{z \sim \tilde{q}_{\rho^e}} [\log p_{\theta^d}(I_R|z,I_S\cdot\phi)] - KL[\tilde{q}_{\rho^e}(z|I_R,I_S\cdot\phi), p(z)]. \quad (5)$$

Since the KL divergence is strictly nonnegative, the left hand side of Equation (5) is a lower bound to log $p(I_R|I_S,\phi)$. Furthermore, for a sufficiently well-trained encoder network 602, the KL divergence term on the left hand side will be close to zero, and hence Equation (5) gives an approximation of the style transfer probability density log $p(I_R|I_S,\phi)$. The first term on right hand side of Equation (5) is tractable by sampling, while the KL term on the right hand side is given in closed form for the multivariate normal distributions $p(z) = \mathcal{N}(0,I)$ and $\tilde{q}_{\rho^e}(z|I_R,I_S\cdot\phi) = \mathcal{N}(\tilde{\mu}_{\rho^e}(I_R,I_S\cdot\phi), \tilde{\Sigma}_{\rho^e}(I_R,I_S\cdot\phi))$.

In the present example, the reference image $I_R$ and the transformed source image $I_S\cdot\phi_t$ are forward propagated through the encoder network 602, causing the encoder network 602 to output a distribution $\tilde{q}_{\rho^e}(z|I_R,I_S\cdot\phi_t)$ of latent variables. One or more latent variables are sampled from the distribution $\tilde{q}_{\rho^e}(z|I_R,I_S\cdot\phi_t)$ and forward propagated through the decoder network 604 along with the transformed source image $I_S\cdot\phi_t$, and the decoder network 604 outputs deterministic functions $\tilde{f}_{\rho^d}(z,I_S\cdot\phi)$ of the one or more sampled latent variables, from which one or more unbiased estimates of the variational lower bound are determined. An estimated gradient of the variational lower bound with respect to $I_S\cdot\phi$, and hence an estimated gradient of the log style transfer probability density with respect to $I_S\cdot\phi$, is determined from the determined unbiased estimates of the variational lower bounds. The gradient of the second term on the right hand side of Equation (4) in the present example is determined by backpropagating the estimated variational lower bound or bounds through the CVAE 600. Since the transformed source image $I_S\cdot\phi$ is a differentiable function of the deformation field $\phi$, the gradient of the variational lower bound with respect to the deformation field is readily determined from the gradient of the variational lower bound with respect to the transformed source image (this may, for example, involve further backpropagation of the variational lower bound). In a further example, the mean value $z_\mu$, of the distribution $\tilde{q}_{\rho^e}(z|I_R,I_S\cdot\phi)$ is forward propagated through the decoder network 604 to determine a deterministic function $\tilde{f}_{\rho^d}(z_\mu, I_S\cdot\phi)$, from which an estimate of the variational lower bound is determined, and this estimate is used for determining an estimated gradient of the log style transfer probability density with respect to $\phi$.

In a further example in which a CVAE is used for generating a conditional model, the ordering of the inputs and conditioning in the CVAE is reversed from that shown in FIG. 6. As a result, the encoder network takes the deformation field as an input, and both the encoder and decoder network are conditioned on the source image and the reference image. Other arrangements are envisaged.

In the example discussed above with reference to FIG. 2, the generative model 202 and the conditional model 204 are pre-trained prior to the correspondence determining method 200 being implemented. In an example in which the generative model 202 is implemented using the VAE 500, synthetic deformation fields are used to pretrain the VAE 500. The synthetic deformation fields are chosen to cover, as best as possible, the expected deformations of a target object of interest. Synthetic deformation fields may be generated, for example, using a parametric model (such as a spline model or a mesh-based model) of a target object (such as an organ in a medical application). Although the synthetic deformation fields used to pre-train the generative model 202 will affect the performance of the deformable registration process, examples of the present embodiment further include refining the generative model using real data, as will be described in detail hereafter, such that even for a small and/or inaccurate initial set of synthetic deformation fields, the prior distribution will improve as more real image data is received and eventually yield accurate results.

Pre-training the VAE 500 using synthetic deformation fields is performed using stochastic gradient ascent, in which each synthetic deformation field is forward propagated through the VAE 500 in order to determine one or more (unbiased) estimated variational lower bounds as given by Equation (4) for each synthetic deformation field. Each estimated variational lower bound is backpropagated through the VAE 500 to determine a gradient of the estimated variational lower bound with respect to the parameters $\theta^e, \theta^d$. Gradient ascent is performed with respect to each estimated variational lower bound, and performing this for a large number of estimated variational bounds and a large number of synthetic deformation fields results in stochastic optimisation of the variational lower bound, and thus causes the decoder network 502 of the VAE 500 to approximate the distribution of synthetic deformation fields, which is then used to determine the prior probability density $p(\phi)$ for a given deformation field. In an example in which the conditional model 204 is implemented using the CVAE 600, the CVAE 600 is pre-trained using pairs of registered images having different modalities.

In some examples, a generative model corresponding to a prior probability distribution of deformation fields is refined using the results of the deformable registration process. In this way, the generative model more accurately approximates the prior distribution of deformation fields as more image pairs are registered.

Figure 7:
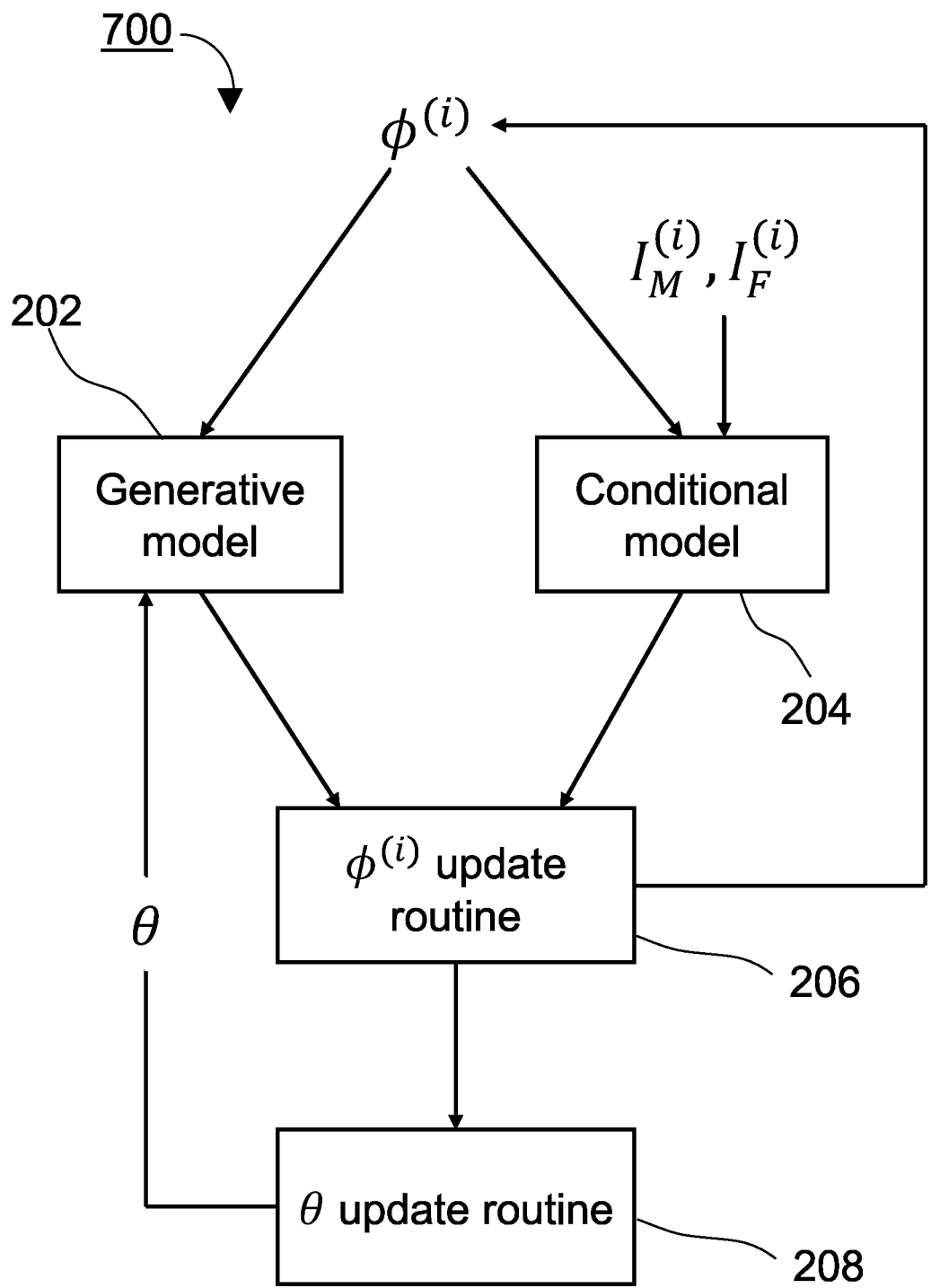
FIG. 7 is a flow diagram of a routine for determining a set of deformation fields.

FIG. 7 shows a correspondence determining method 700, which is an example of the correspondence determining method 200 described above, and employs, in addition to the generative model 202, the conditional model 204, and the deformation field update routine 206, a parameter update routine 208 for updating parameters of the generative model 202. In this example, the image data includes a set of pairs $(I_S^{(i)}, I_R^{(i)})$ of source images and reference images for such that each reference image in the set is associated with one source image in the set. For each pair in the set, a converged deformation field, $\phi_T^{(i)}$ is determined, for example using the routine 400, and the parameter update routine updates parameters of the generative model 202 using the determined converged deformation field $\phi_T^{(i)}$. One such method involves, for each converged deformation field $\phi_T^{(i)}$, updating parameters of the generative model 202, to optimise the prior probability density $p(\phi_T^{(i)})$ with respect to the parameters of the generative model 202.

Figure 8:
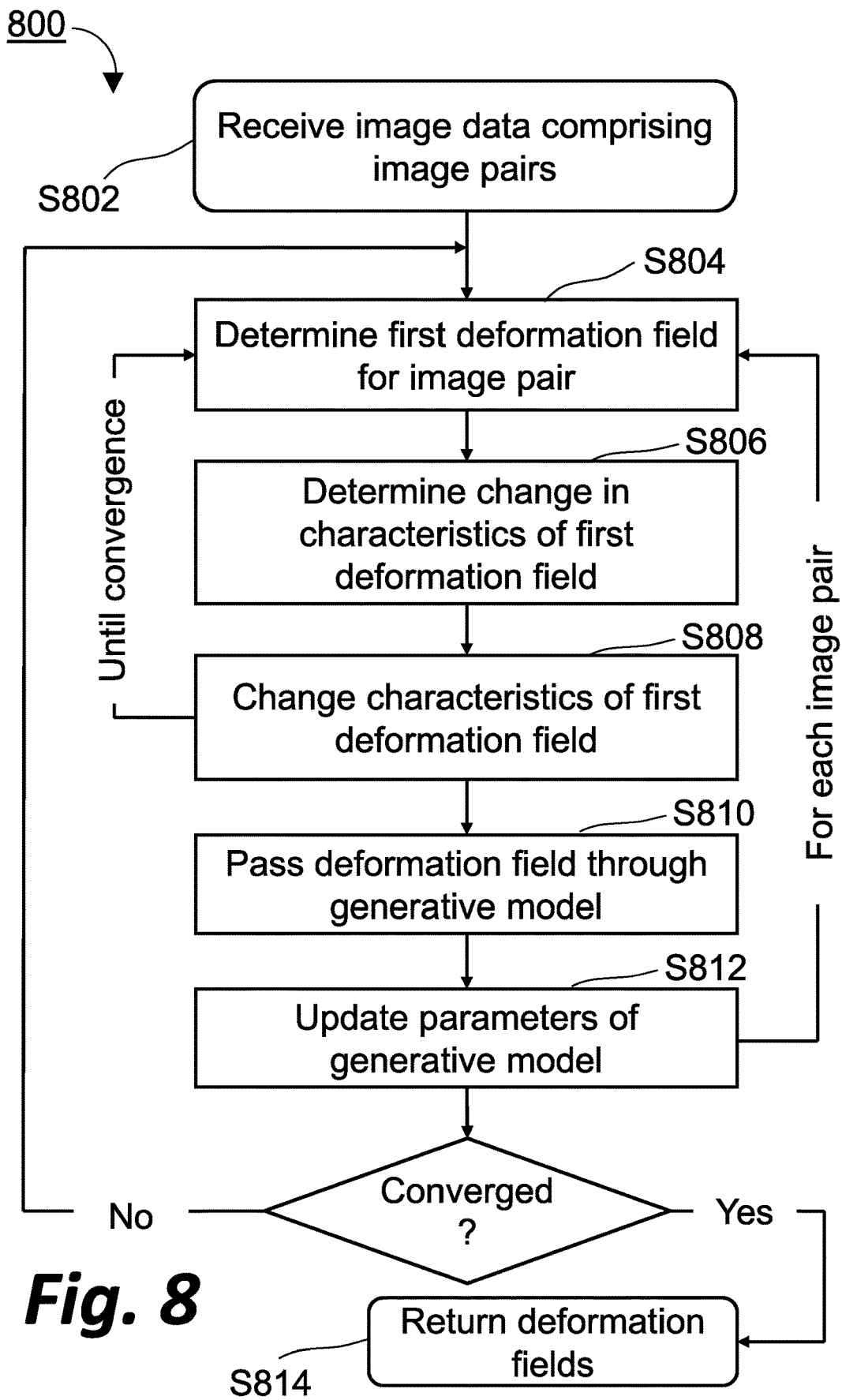
FIG. 8 is a block diagram of a computing device for registering a source image to a reference image.

FIG. 8 shows an exemplary routine 800, which, when executed by a computing device, causes the computing device to perform the correspondence determining method 700. The computing device receives, at S802, the image data comprising the set of pairs $(I_S^{(i)}, I_R^{(i)})$ of source images and reference images. For each image pair, the computing device determines, at S804, a respective initial deformation field $\phi_0^{(i)}$. As described above, determining an initial deformation field may involve sampling from the generative model 202, or may include receiving an initial guess of the deformation field.

For each image pair, the computing device determines, at S806, a change in one or more characteristics of the respective deformation field $\phi_0^{(i)}$. In this example, the change in characteristics is determined using an equivalent process to that described above with reference to FIG. 4. The computing device changes, at S808, characteristics of the respective deformation field in accordance with the determined change. The process changing the characteristics is repeated iteratively, resulting in a sequence of deformation fields $\{\phi_t^{(i)}\}_{t=0}^T$, where $\phi_T^{(i)}$ is a converged deformation field that satisfies predetermined convergence criteria. For i=1, ... K, the converged deformation field $\phi_T^{(i)}$ represents a first estimate of the correspondence between the source image $I_S^{(i)}$ and the reference image $I_R^{(i)}$.

The computing device passes, at S810, each converged deformation field $\phi_T^{(i)}$ through the generative model 202, and updates, at S812, parameters of the generative model 202, to optimise the prior probability density with the respect to the parameters of the generative model.

In an example in which the generative model 202 is implemented using the VAE 500, parameters of the VAE 500 are updated to optimise the variational lower bound of the log prior probability density given by Equation (4) above. For each image pair, the converged deformation field $\phi_T^{(i)}$ is forward propagated through the encoder network 502, causing the encoder network 502 to output a distribution $q_{\theta^e}(z|\phi_T^{(i)})$ of latent variables associated with the converged deformation field $\phi_T^{(i)}$. One or more latent variables are sampled from the distribution $q_{\theta^e}(z|\phi_T^{(i)})$ and forward propagated through the decoder network 504, which outputs deterministic functions $f_{\theta^d}(z)$ of the one or more sampled latent variables, from which one or more unbiased estimates of the variational lower bound are determined. An estimated gradient of the variational lower bound with respect to $\theta^e, \theta^d$, and hence an estimated gradient of the log prior probability density $\log p(\phi_T^{(i)})$ with respect to $\theta^e, \theta^d$, is determined by backpropagating the estimated variational lower bound or bounds through the VAE 500. A gradient-based update rule is applied to update the parameters $\theta^e, \theta^d$. By performing this procedure iteratively until predefined convergence criteria are satisfied, the variational lower bound is optimised with respect to the parameters $\theta^e, \theta^d$, and hence the prior probability density $p(\phi_T^{(i)})$ is optimised (indirectly) with respect to the parameters $\theta^e, \theta^d$. In a further example, the mean value $z_\mu$ of the distribution $q_{\theta^e}(z|\phi_T^{(i)})$ is forward propagated through the decoder network 504 to determine a deterministic function $f_{\theta^d}(z_\mu)$, from which an estimate of the variational lower bound is determined. The estimated variational bound is then backpropagated to determine the approximate gradient of $\log p(\phi_T^{(i)})$ with respect to $\theta^e, \theta^d$ and a gradient-based update rule is used to update the parameters $\theta^e, \theta^d$ based on this approximate gradient.

Having updated the parameters of the generative model 202 using each first estimate $\phi_T^{(i)}$ corresponding to each image pair, the routine 800 returns to S804. S804-S812 are performed iteratively. At each iteration, the computing device determines, for each image pair, a new estimate of the deformation field, and uses the new estimate to update the parameters of the generative model. This iterative process continues until predefined convergence conditions are satisfied. The predefined convergence conditions may be based on the estimated deformation fields, the parameters of the generative model, or a combination of both. Suitable convergence criteria for gradient-based optimisation methods will be well-known to those skilled in the art. When the predefined convergence criteria are satisfied, the computing device returns, at S814, the converged deformation fields, which each encodes co-ordinate transformation representing a correspondence between each source images $I_S^{(i)}$ and corresponding reference image $I_R^{(i)}$.

In some examples of the above method, the same computing device is used to register pairs of images and to update parameters of the generative model 202 using the registered pairs. In other words, the computing device updates parameters in parallel with registering images. In other examples, updating the parameters of the generative model 202 is performed by a separate computing device. For example, a deployed computing device/system may perform deformable registration on a set of images, and send the resulting deformation fields to a training device/system, which uses the images to determine updated parameters for the deployed computing device/system. This arrangement may be particularly relevant for medical applications, for reason explained hereafter.

In some examples, a similar iterative process to that described above for updating the parameters of the generative model 202, is also applied to update parameters of the conditional model 204. In such examples, each converged deformation field is passed through the conditional model 204, and the parameters of the conditional model are updated to optimise the style transfer probability density with respect to the parameters of the conditional model 204. In some examples, updating the parameters of the conditional model 204 is performed after each iteration of updating the deformation field and the parameters of the generative model 202. In other examples, the parameters and the deformation field are updated in a different order. In some examples, a single joint optimisation step is performed in which the deformation field, the parameters of the generative model 202, and the parameters of the conditional model 204, are updated together to optimise the posterior probability density $p(\phi_T^{(i)}|I_R^{(i)}, I_S^{(i)})$.

Some examples of the present embodiments include alternative or further steps to refine the generative model and/or the conditional model, or to otherwise improve the accuracy of the determined correspondence. In one such example, a source image $I_S$ is registered to a reference image $I_R$ using the method described herein, yielding a first converged deformation field $f$. The same reference image $I_R$ is registered to the same source image $I_S$, yielding a second converged deformation field $g$. For cyclic continuity, the second deformation field $g$ should be the inverse of the first deformation field $f$. In order to make use of this additional constraint, an error associated with the composition $\theta \cdot g$, and an identity field Id (corresponding to an identity co-ordinate transformation) is backpropagated through the generative model and/or the conditional model, and a gradient-based optimisation method is then used to update parameters of the generative model and/or the conditional model such that the error is minimised. In one example, the error associated with the composition $f \cdot g$ and an identity field Id is given by an $L_2$ norm $\|f \cdot g - \text{Id}\|_{L_2}$.

In another example, a deformation field $\phi$ is parameterised using a stationary or time-varying velocity field $v_\phi$, which is exponentiated to give the deformation field i.e. $\phi = \exp(v^\phi)$. Considering deformation fields $f$ and $g$ as before, backpropagating a loss given by $\|v_f + v_g\|_{L_2}$ through the generative model and/or the conditional model, and updating the parameters of the generative model and/or the conditional model to minimise the loss, has an inertial effect that encourages the method to generate diffeomorphic deformation fields.

Updating parameters of the generative model and/or the conditional model using image data as described above results in the prior probability distribution and/or the conditional probability distribution more accurately reflecting the data as the method is performed. Using large volumes of image data, and performing the refinement steps iteratively, the models may become highly accurate even in cases where the generative model and/or the conditional model were poorly pretrained, for example due to a lack of ground-truth data or sufficiently accurate synthetic data.

Updating parameters of the generative model and/or the conditional model, as described in the examples above, affects the performance of the registration process. In some applications, such as medical applications, devices are subject to regulatory approval and may only be deployed after such approval is granted. In the case of the present embodiment, it is anticipated that the performance of a device implementing the deformable registration process would be tested for a fixed set of model parameters, and that updating these model parameters in a deployed device (or equivalently, updating model parameters in a remote system in the case of a network-based implementation) may result in the regulatory approval no longer being valid. It is therefore suggested that parameters of a deployed system/device would be frozen, such that the deployed system/device performs image registration without updating the parameters. Image data sent to the deployed system/device would simultaneously be sent to a secondary system/device that "mirrors" the deployed system/device. Parameters of the secondary system/device would be updated using the methods described above, and hence the performance of the secondary system/device would be expected to improve over time, but the output of the secondary device would never be used for the intended purpose of the deployed device (for example, making clinical decisions in the case of a medical application). At a later time, regulatory approval would be sought for the secondary system/device, and if granted, the updated parameters of the secondary system/device would be imported to the deployed system/device. This process of updating and seeking regulatory approval could be performed periodically, for example.

The present embodiment provides an accurate and widely-applicable method of performing deformable registration. Some examples of the present embodiment include an additional process in which supervised learning model is used to train a one-shot model, such that the one-shot model may subsequently be used to determine approximations of converged deformation fields resulting from the variational method described above. In one such example, the one-shot model is a regression network. In other examples, other one-shot models may be used, for example support vector machines (SVMs). In any of these examples, a one-shot method takes a source image and a reference image as inputs, and outputs an approximation of the converged deformation field that would result from the application of the variational method described above to the same source image and reference image. Determining an approximation of a converged deformation field using the one-shot model may result in a significant time saving compared with determining a converged deformation field using the variational method, and if one-shot model is sufficiently well-trained, may suffer only a very slight loss of accuracy compared with the variational method.

In the example in which the one-shot model is a regression network, the regression network may be any suitable neural network, for example a convolutional neural network (CNN) configured for regression. In such an example, a method of training the regression network includes forward propagating a source image and a reference image through the network, to determine a first approximation of the converged deformation field corresponding to the source image and the reference image. The method continues by determining an error associated with the first approximation and the converged deformation field determined using the variational method. In one example, the error is a mean-squared difference between the first approximation and the converged deformation field, but other suitable metrics for quantifying a difference between two deformation fields may be used in other examples.

The determined error is backpropagated through the regression network, to determine gradients of the determined error with respect to parameters of the regression network. The parameters of the regression network are updated using a gradient-based update rule, whereby to reduce the error associated with the first approximation and the converged deformation field. The parameters are iteratively updated in this way until predetermined convergence criteria are satisfied. The training process is repeated for a large number of source images, reference images, and corresponding converged deformation fields, such that the regression network learns how to determine deformation fields for unregistered pairs of source images and reference images.

In other examples in which supervised learning is used to train a one-shot model for approximating a converged deformation field, the one-shot model may be trained in parallel to the updating of parameters of the generative and/or conditional models used in the variational method. In such examples, partially-converged deformation field, as opposed to, or as well as, converged deformation fields, may be used to train the one-shot model.

In another example, reinforcement learning may be used to train an autonomous agent to determine approximations of converged deformation fields resulting from the variational method. In one such example, an approximation of a deformation field is associated with a policy of the autonomous agent. The policy is updated according to a predetermined reward structure, such that higher (conventionally, though not necessarily, more positive) rewards are associated with actions that reduce an error associated with the approximation and the converged deformation field resulting from the variational method. By applying this method to a large number of source images, reference images, and corresponding converged deformation fields, the autonomous agent learns how to determine deformation fields for unregistered pairs of source images and reference images.

The above embodiments are to be understood as illustrative examples of the invention. Further embodiments of the invention are envisaged. For example, the described routines could be performed by a cluster or network of computing devices, for example in a cloud-based architecture. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of determining a correspondence between a source image and a reference image, the method comprising:
   storing, in a memory:
      a pre-trained generative model corresponding to a prior probability distribution of deformation fields, each deformation field corresponding to a respective coordinate transformation; and
      a pre-trained conditional model for generating a style transfer probability distribution of reference images, given a source image and a deformation field;
   receiving first image data comprising the source image;
   receiving second image data comprising the reference image;
   determining an initial first deformation field; and
   iteratively performing an update process, until convergence, to update the first deformation field, to generate a converged deformation field representing the correspondence between the source image and the reference image, the update process comprising:
      determining a change in one or more characteristics of the first deformation field to increase a posterior probability density associated with the first deformation field, given the source image and reference image; and
      changing the one or more characteristics in accordance with the determined change,
      wherein the posterior probability density is based on:
         a prior probability density associated with the first deformation field, the prior probability density determined using the pre-trained generative model; and
         a style transfer probability density associated with the reference image, given the source image and the first deformation field, the style transfer probability density determined using the pre-trained conditional model.

2. The method of claim 1, further comprising applying the converged deformation field to the source image, to determine a transformed source image.

3. The method of claim 1, wherein the pre-trained generative model is implemented using a variational autoencoder (VAE).

4. The method of claim 3, wherein determining the change in one or more characteristics of the deformation field comprises:
   forward propagating the first deformation field through an encoder network of the VAE, to determine a distribution of latent variables associated with the first deformation field;
   sampling one or more latent variables from the determined distribution of latent variables;
   forward propagating the sampled one or more latent variables through the decoder network of the VAE, to determine one or more estimated variational bounds associated with the prior probability density; and
   backpropagating the or each estimated variational bound through the VAE, to determine an estimated gradient associated with the prior probability density.

5. The method of claim 4, wherein each of the one or more estimated variational bounds is given by:

$$\log p(\phi) \mathrm{KL}[q_{\theta^e}(z|\phi), p(z|\phi)] = \mathbb{E}_{z \sim q_{\theta^e}}[\log p_{\theta^d}(\phi|z)] - \mathrm{KL}[q_{\theta^e}(z|\phi), p(z)],$$

wherein:
   $\phi$ is the first deformation field;
   $p(\phi)$ is the prior probability density associated with the first deformation field;
   $p(z)$ is a predetermined prior distribution of latent variables z;
   $p(z|\phi)$ is a distribution of latent variables z, given the first deformation field;
   $q_{\theta^e}(z|\phi)$ is an approximate distribution of latent variables z, given the first deformation field, as generated by the encoder network of the VAE parameterized by $\theta^e$;
   $p_{\theta^d}(\phi|z)$ is an approximate distribution of deformation fields, given a latent variable z parameterized by $\theta^d$;
   KL denotes a Kullback-Leibler divergence; and
   $\mathbb{E}_{z \sim q_{\theta^e}}$ denotes an approximate expectation value, determined by sampling a latent variable z from the approximate distribution $q_{\theta^e}(z|\phi)$.

6. The method of claim 1, further comprising updating parameters of the pre-trained generative model, to optimise the prior probability density with respect to the parameters of the pre-trained generative model.

7. The method of claim 6, wherein:
   the first image data comprises a plurality of source images;
   the second image data comprises a plurality of reference images, each of the plurality of references images being associated with one of the plurality of source images; and
   the method comprises iteratively, for each of the plurality of reference images and associated one of the plurality of source images:
      determining an initial respective deformation field; and
      iteratively performing the update process to update the respective deformation field, to generate a converged respective deformation field;
      passing the converged respective deformation field through the pre-trained generative model; and
      updating parameters of the pre-trained generative model, to optimise the prior probability density associated with the respective deformation field.

8. The method of claim 1, wherein the pre-trained conditional model comprises a multivariate normal distribution.

9. The method of claim 1, wherein the pre-trained conditional model is implemented using a conditional variational autoencoder (CVAE).

10. The method of claim 1, further comprising updating parameters of the pre-trained conditional model, to optimise the style transfer probability density with respect to the parameters of the pre-trained conditional model.

11. The method of claim 1, further comprising:
   determining a first converged deformation field for registering a first source image to a first reference image;
   determining a second converged deformation field for registering the first reference image to the first source image;
   determining an error associated with a composition of the first deformation field and the second deformation field, and an identity field;
   backpropagating the determined error associated with the composition of the first deformation field and the second deformation field, and the identity field, through at least one of the pre-trained generative model and the pre-trained conditional model; and
   updating parameters of the at least one of the pre-trained generative model and the pre-trained conditional model, to minimise the error associated with the composition of the first deformation field and the second deformation field, and the identity field.

12. The method of claim 1, further comprising:
determining a first converged deformation field for registering a first source image to a first reference image, the first converged deformation filed parameterised by a first velocity field;
determining a second converged deformation field for registering the first reference image to the first source image, the second deformation field parameterised by a second velocity field;
determining a loss associated with the first velocity field and the second velocity field;
backpropagating the determined loss through at least one of the pre-trained generative model and the pre-trained conditional model; and
updating parameters of the at least one of the pre-trained generative model and the pre-trained conditional model, to minimise the loss associated with the first velocity field and the second velocity field.

13. The method of claim 1, further comprising training, using supervised learning, a one-shot model for determining an approximation of the converged deformation field.

14. The method of claim 13, wherein the one-shot model comprises a regression network, and wherein the training comprises:
forward propagating the source image and the reference image through the regression network, to determine a first approximation of the converged deformation field; and
iteratively:
determining an error associated with the first approximation and the converged deformation field;
backpropagating the determined error associated with the first approximation and the converged deformation field through the regression network, to determine a gradient of the determined error with respect to parameters of the regression network; and
updating the parameters of the regression network, the updating reducing the error associated with the first approximation and the converged deformation field.

15. The method of claim 1, further comprising using reinforcement learning to train an autonomous agent to determine an approximation of the converged deformation field.

16. The method of claim 1, wherein the first image data and the second image data comprise medical images.

17. An apparatus for determining an estimated deformation field for registering a source image to a reference image, the apparatus comprising:
a memory storing:
a pre-trained generative model corresponding to a prior probability distribution of deformation fields, each deformation field corresponding to a respective co-ordinate transformation;
a pre-trained conditional model for generating a style transfer probability distribution of reference images, given a source image and a deformation field;
receiving first image data comprising the source image; and
an update routine; and
an interface module configured to:
receive first image data comprising the source image; and
receive second image data comprising the reference image,
wherein the update routine is operable to:
determine an initial first deformation field; and
iteratively perform an update process to update the first deformation field, to generate a converged deformation field, the update process comprising:
determining a change in one or more characteristics of the first deformation field to increase a posterior probability density associated with the first deformation field, given the source image and reference image; and
changing the one or more characteristics in accordance with the determined change,
wherein:
the posterior probability density is based on:
a prior probability density associated with the first deformation field, the prior probability density determined using the pre-trained generative model; and
a style transfer probability density associated with the reference image, given the source image and the first deformation field, the style transfer probability density determined using the pre-trained conditional model; and
the converged deformation field represents the correspondence between the source image and the reference image.

18. A non-transitory computer readable storage medium having stored therein data representing instructions which, when performed by a computer, cause the computer to determine a correspondence between a source image and a reference image, the instructions comprising:
storing, in a memory:
a pre-trained generative model corresponding to a prior probability distribution of deformation fields, each deformation field corresponding to a respective co-ordinate transformation; and
a pre-trained conditional model for generating a style transfer probability distribution of reference images, given a source image and a deformation field;
receiving first image data comprising the source image;
receiving second image data comprising the reference image;
determining an initial first deformation field; and
iteratively performing an update process, until convergence, to update the first deformation field, to generate a converged deformation field representing the correspondence between the source image and the reference image, the update process comprising:
determining a change in one or more characteristics of the first deformation field to increase a posterior probability density associated with the first deformation field, given the source image and reference image; and
changing the one or more characteristics in accordance with the determined change,
wherein the posterior probability density is based on:
a prior probability density associated with the first deformation field, the prior probability density determined using the pre-trained generative model; and
a style transfer probability density associated with the reference image, given the source image and the first deformation field, the style transfer probability density determined using the pre-trained conditional model.

* * * * *